J. W. Woodruff,
Washing Machine,
№ 69,059.        Patented Sept. 17, 1867.

Witnesses:
J. Lehmann
Robt. Green

Inventor:
J. W. Woodruff
Per
J. H. Alexander & Co.
Attys

United States Patent Office.

J. W. WOODRUFF, OF WATSON, ILLINOIS.

Letters Patent No. 69,059, dated September 17, 1867.

IMPROVED WASHING MACHINE.

*The Schedule referred to in these Letters Patent and making part of the same.*

TO ALL WHOM IT MAY CONCERN:

Be it known that I, J. W. WOODRUFF, of Watson, in the county of Sangamon, and State of Illinois, have invented certain new and useful improvements in Washing Machines; and I do hereby declare that the following is a full, clear, and exact description of the same, reference being had to the accompanying drawings, and to the letters of reference marked thereon, in which—

The nature of my invention consists in the employment, combination, and arrangement of certain devices, the peculiarities of which will be hereinafter fully set forth; and to enable others skilled in the art to make and use it, I will now describe its construction and operation.

Figure 1:
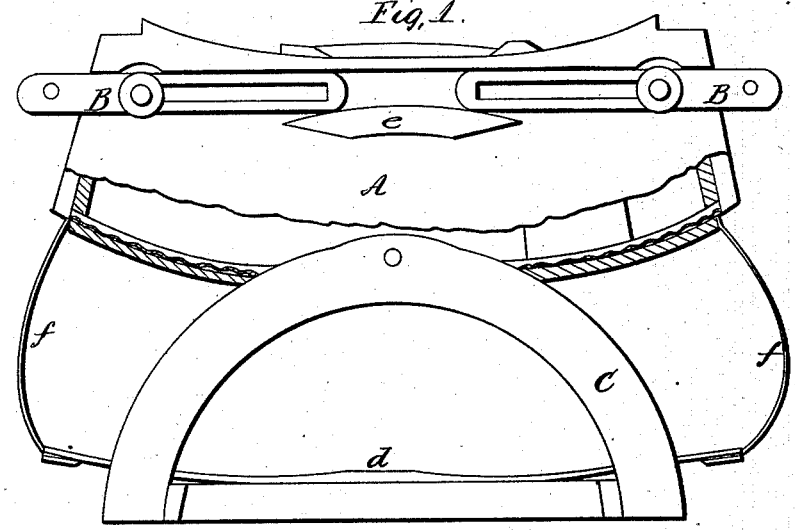
Figure 1 is a side elevation.
Figure 2:
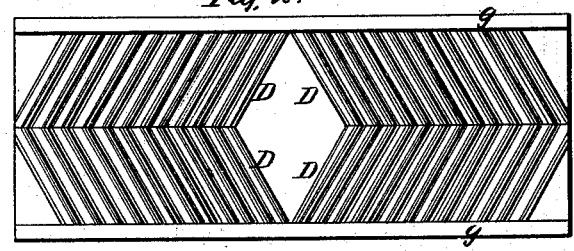
Figure 2 is a plan of the bottom, showing the manner of forming corrugations, and Figure 3 an end view of the beater.
Figure 3:
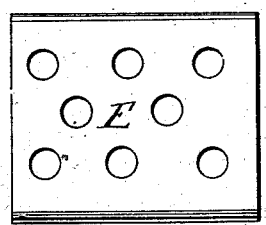

A represents an oblong box, with a concave bottom; said box is of course provided with a suitable top or covering. B B represent sliding handles, by means of which leverage is either increased or diminished. Thus, if the box is filled with water and the articles to be cleansed, the labor of working the machine would be greatly diminished by drawing out the handles, thereby increasing the leverage. $e\ e$ represent supports for the slotted bars of handles B B to rest upon when it is desirable to use short leverage. C represents the frame, between each side of which is pivoted the box A, as fully shown in fig. 1. $a$ is a flat spring, secured at its centre to the cross of frame C. Each end of this spring is connected to box A by means of the straps $ff$. D represents a zinc or tin bottom. Said bottom should be corrugated, as seen in fig. 2, leaving a plain surface of diamond shape at its centre. $g\ g$ are ways for the beater to slide upon. E represents the beater, which should be made slightly convex at bottom and top, and concave on its sides. Said beater is provided with a number of holes, extending through it, as seen in fig. 3.

The operation of my machine is obvious, being only necessary, after the water and clothing to be washed are put in, to rock the machine until the articles are sufficiently cleansed.

What I desire to secure by Letters Patent, is—

The sliding handles B B, box A, spring $a$, and beater E, all being combined and operated as and for the purpose set forth.

In testimony whereof I set my hand in presence of two witnesses.

J. W. WOODRUFF.

Witnesses:
 J. H. DAWSON,
 JOHN MURPHY.